United States Patent Office
2,820,961
Patented Jan. 21, 1958

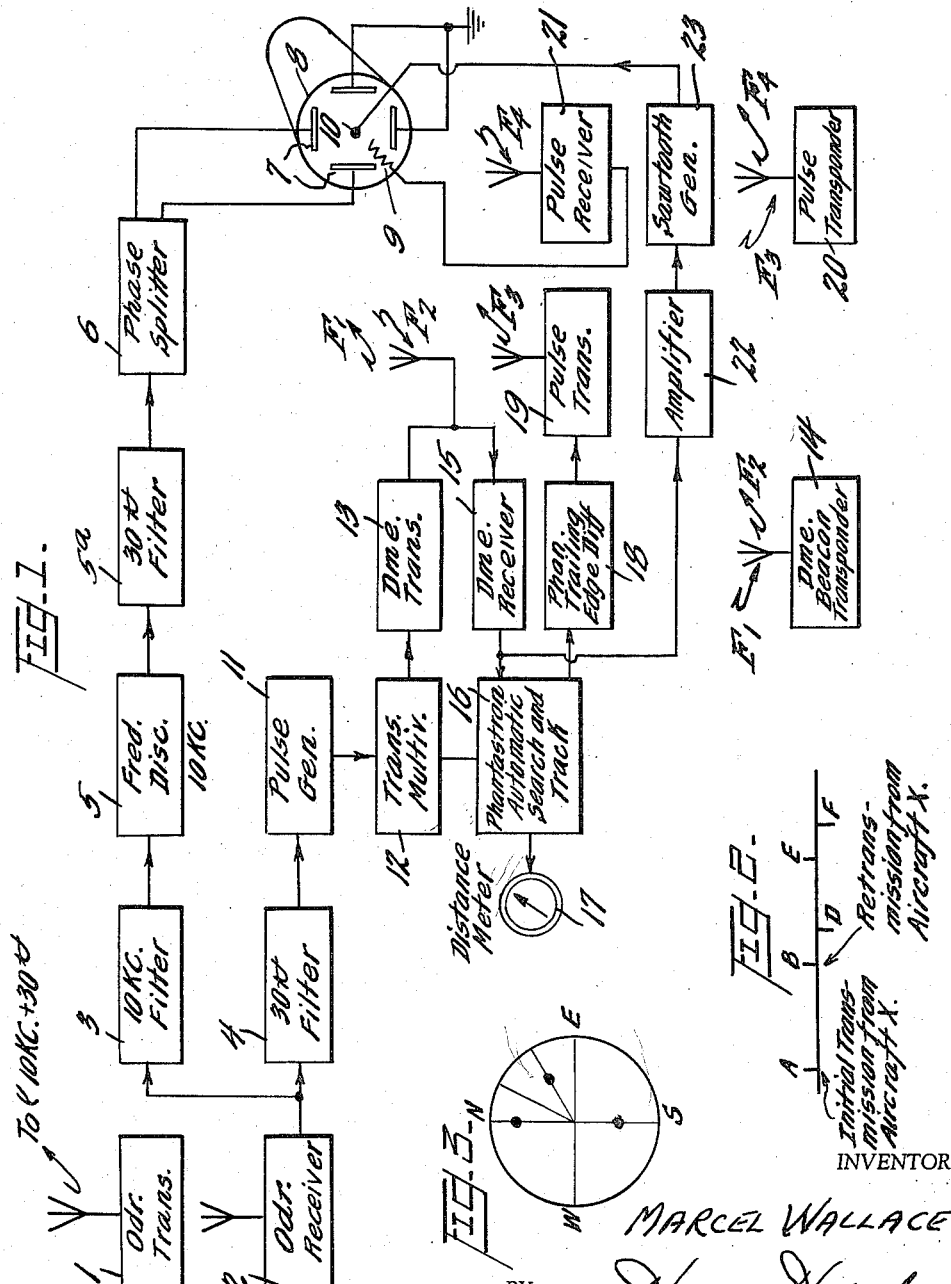

2,820,961

NAVIGATIONAL SYSTEM

Marcel Wallace, East Port Chester, Conn., assignor to Panoramic Radio Products, Inc., Mount Vernon, N. Y., a corporation of New York Application January 16, 1953, Serial No. 331,649

2 Claims. (Cl. 343—15)

This application is a continuation on my application Serial No. 775,696, filed September 23, 1947, and entitled "Synchrometric Plan Position Indicator System," now abandoned.

This invention relates generally to radio aids to navigation and more particularly involves a system for providing aboard each of a plurality of aircraft indications of bearing and range of each of said plurality of aircraft in respect to a common geographical location.

Briefly described, the present invention involves utilization, aboard each of a group of aircraft, of transmissions derived from a conventional type of omni-directional radio beacon transmitter and signals provided by a pulse type distance measuring equipment and transponders cooperating therewith for providing aboard the aircraft of the group indications of the above character.

As of the present date, standards have been agreed upon for use at all airports and traffic control centers, governing an omni-directional radio beacon system which provides thirty cycle modulation of equal phase omni-directionally, as well as a further thirty cycle modulation, the phase of which depends upon the bearing from the beacon transmitter at which it is received. Each aircraft utilizing the omni-directional beacon transmissions is provided with a receiver, and with a phase comparator connected to the output of the receiver. The receiver receives the signals above referred to from the beacon station and applies them over two separate channels to the phase comparator, a measurement of relative phase of the two signals aboard any aircraft providing a measurement of bearing of that aircraft with respect to the beacon transmitter.

Further standards have been promulgated for systems of air navigation, and governing a distance measuring system comprising fundamentally a pulse transmitter and a pulse receiver aboard each aircraft utilizing the system and a transponder at each airport or traffic control center, which transponds pulses, provided by the pulse transmitter, back to the pulse receiver aboard each aircraft, the elapsed time of transmission providing a measure of range in well known manner. The distance measuring transmitters and receivers aboard the aircraft will hereinafter be designated DME, an abbreviation of the expression "distance measuring equipment" which has become conventionalized in the art. Standard DME receivers are gated to respond to received transponded pulses only at times corresponding with the range of the DME transmitters from a desired transponder. The purpose of this expedient is to prevent reception of transponded pulses or of directly transmitted pulses which are foreign to a given DME receiver and which, therefore, would tend to cause erroneous distance measurement. While I prefer use of the above briefly described distance measuring equipment in the system of my invention, I do not intend to preclude thereby use of other types of pulse radar systems, which may be equally applicable to utilization in the system of the present invention.

In the system of the present invention one of the signals received aboard each aircraft from the omni-directional radio beacon transmitter, hereinafter referred to as the ODR transmitter, and specifically that one of the signals, the phase of which varies with bearing of the receiving craft from the ODR transmitter, is utilized to control the time of transmission of each pulse from the DME transmitter so that transmissions are no longer random but occur at times having telemetric significance, i. e., representing the bearing of the transmitting craft with respect to the ODR transmitter. With respect to different aircraft flying in a given area, DME transmissions have a controlled randomness since the aircraft do not have precisely identical bearings and, therefore, pulses are transmitted at different times from different aircraft. The DME transmitter, accordingly, performs two functions, (1) its normal function for transmitting pulses for distance measuring purposes, and (2) the function of transmitting pulses which are timed in such a manner as to enable translation of pulse time position into remote indications of the bearing of the transmitter craft.

Pulses transmitted by the DME transmitter aboard the various aircraft are transponded from a DME transponder located on the ground and preferably adjacent to the ODR transmitter and are received aboard the transmitting craft by means of a DME receiver, the output of which is utilized to provide a measurement of range of the craft on a pointer type meter. The transponded pulses are further received aboard every aircraft utilizing the system and utilized at these craft to initiate a timing operation. Upon reception of the transponded pulse aboard the transmitting aircraft, the received pulse not only initiates a timing operation there but also effects a retransmission to a further pulse transponder, pulses from which may be received aboard all the craft of the system, and which, when so received, terminate the timing operation.

Since the DME receivers include gating wave generators operative to gate on only during extremely short intervals corresponding with times of expected pulse receptions, in a distance measuring operation, whereas the pulses transmitted from remote aircraft in the present invention may occur at any time depending upon the bearing of the transmitting craft, auxiliary signal translating devices are provided aboard each craft for translating, in conjunction with the DME receiver, pulses transmitted from the aircraft.

Indications may be provided, on the face of a cathode ray tube indicator, of bearings and ranges of all aircraft utilizing the system, in the following manner: The wave of the constant phase azimuthally, which is provided by the ODR transmitter, may be utilized aboard each of the aircraft for moving the beams of the cathode ray tube indicators in synchronism along one coordinate of the coordinate system provided by the face of the indicator. Specifically, for example, I may utilize the wave of constant phase to rotate the beams of the cathode ray tube indicators at all stations in synchronism and in time phase. The cathode ray tube indicator utilized may be provided with an intensifier grid and with a radial deflection anode, the former of which biases the beam approximately to cut off, and the latter of which constrains the beam to travel its circular path at a predetermined radius. Reception, aboard any aircraft, of a transponded pulse, initiates operation of a sawtooth sweep generator, the output of which is applied to the radial deflection anode and which serves to cause an extremely rapid radial deflection of the beam of the indicator. Reception of the second transponded pulse aboard each aircraft results in intensification of the beam to produce a visible spot. Since at the time of transmission of the pulses the cathode ray beams aboard all the aircraft occupy positions along a circular path of travel which is coordinated with the bearing of the then transmitting craft, the radial trace takes place in a direction corresponding with the bearing of the then transmitting craft. The time elapse between initiation of the sawtooth wave and the intensification of the beam aboard each of the aircraft depends further upon the difference in time, as received aboard each of the aircraft, of two transponded pulses, and is, consequently, as will be developed mathematically in the detailed description of the invention, independent of the distance of the receiving craft and representative only of the range of the then transmitting craft.

It is, accordingly, an object of the present invention to provide a system of radio aids to air navigation wherein the bearing and range of each of a plurality of aircraft may be continually and automatically reported by radio to every craft flying in the vicinity of a given airport or traffic control center.

It is a further object of the invention to provide a system of radio aid to navigation wherein each aircraft transmits periodically signals representative of its bearing and wherein the latter signals control further apparatus for providing aboard each aircraft utilizing the system a measure of range of the transmitting aircraft from a predetermined geographic location.

It is still another object of the invention to provide a system wherein is transmitted from a fixed location a series of pulses time spaced in accordance with the range of said location from a second location, the time spacing between the pulses being representative of the distance between the two locations.

The above and still further objects, advantages, and features of the invention will become evident by reference to the following detailed description of one specific embodiment thereof, especially when taken in conjunction with the accompanying drawings, wherein:

Figure 1 represents in functional block diagram the system of the invention;

Figure 2 is a timing diagram of pulse transmissions, in the system of Figure 1; and Figure 3 is a representation of the face of a cathode ray tube indicator having indications thereon, as provided in the system of Figure 1.

Referring now specifically to Figure 1 of the drawings, the reference numeral 1 represents an omni-directional radio transmitter of conventional type and which has been standardized for utilization at all airports by order of the Civil Aeronautics Authority, as well as by international convention. Briefly described, the omni-directional radio transmitter, which hereinafter will be referred to as the ODR transmitter 1, comprises means for transmitting a carrier $f_0$ which is modulated in amplitude by a ten kilocycle subcarrier, the latter in turn being modulated in frequency by a thirty cycle wave. The carrier $f_0$ is transmitted omni-directionally, and upon reception and detection thereof, the thirty cycle modulation may be abstracted and utilized as a reference signal having identical phase in all directions from the ODR transmitter 1. The ODR transmitter 1, further, comprises means for transmitting a rotating pattern of energy comprising sidebands derived from the carrier $f_0$ by amplitude modulation thereof with a thirty cycle signal. Abstraction of the latter thirty cycle signal from the total transmission of the ODR transmitter 1 by combining the rotating sideband energy with the omni-directional carrier $f_0$ provides a thirty cycle signal which has a different phase for every bearing with respect to the ODR transmitter 1. By comparison of the phases of the two thirty cycle signals above referred to, one of which has identical phase for all bearings and the other of which has a phase dependent upon the bearing from the ODR transmitter 1, a measurement of bearing relative to the ODR transmitter may be accomplished at any receiving location.

Since the ODR transmitter above briefly described is well known in the art, its details have not been illustrated in the drawings. The character of the transmitter itself, further, forms no part of the present invention, except insofar as it provides certain signals required for the operation of the present system. It will be realized that other types of omni-directional radio beacon systems are known in the art, which provide two signals at every point in space surrounding the station, one of which is of constant phase azimuthally and the other of which has phase dependent upon its bearing. Any of these systems may be substituted for the system above briefly described, without modification, in the practice of my invention, except in respect to the manner in which a signal of reference phase and a signal of bearing representative phase are derived aboard aircraft utilizing the system.

Signals derived from the ODR transmitter 1 in the system of the present invention are received aboard each of a plurality of aircraft flying adjacent to the transmitter, each of the aircraft being provided with an ODR receiver 2, the output of which is provided in parallel to the pair of filters 3 and 4, the filter 3 serving to separate out from the output of the ODR receiver 2 the ten kilocycle subcarrier there present, and the filter 4 serving to separate out from the output of the ODR receiver 2 the thirty cycle signal of bearing representative phase there present. The output of the filter 3 is applied to a ten kilocycle discriminator 5 which detects the thirty cycle frequency modulation present in the ten kilocycle subcarrier, the latter thirty cycle signal being separated from the detection components in the output of the discriminator 5 by means of a thirty cycle filter 5a. The output of the thirty cycle filter 5a is applied, via phase splitter 6, to a pair of mutually perpendicular deflection plates 7 of a cathode ray tube oscilloscope 8 of generally conventional character and which is provided with an intensifying grid 9 and a radial deflection anode 10.

Since the phase of the thirty cycle modulation provided by the filter 5a is identical for all bearings from the ODR transmitter 1, all aircraft flying in the vincinity of the transmitter and equipped in accordance with the present invention are provided with circular traces identically synchronized and framed or phased, on the faces of the oscilloscopes 8 aboard the various craft.

The output of the thirty cycle filter 4, which has a phase aboard each aircraft depending upon the bearing of that aircraft from the transmitter 1, is utilized to produce a pulse by means of a pulse generator 11, the time of the pulse bearing a fixed relation to the phase of the thirty cycle signal provided by the filter 4 and preferably occurring as the wave passes through zero in a given direction. Pulse generators for accomplishing this purpose are well known in the art and, accordingly, no specific example of such a generator need be provided. Suffice it to state that one positive pulse is produced for each complete cycle of output of filter 4, the pulse being controlled in accordance with the phase of this output and having a time position corresponding with the bearing of the aircraft with respect to the transmitter 1. The output of the pulse generator 11 is applied to a trigger circuit 12, in the form of a multivibrator, which serves to trigger a distance measuring or radar transmitter 13, forming part of a distance measuring equipment provided aboard each of the aircraft utilizing the system of the invention. While the present invention may be practiced in conjunction with various types of radar equipments, I have illustrated and will describe one specific type of such equipment hereinafter referred to as a DME, the letters standing for "distance measuring equipment." The DME illustrated in the accompanying drawings and described hereinafter is of a general type approved and standardized by international convention for use aboard aircraft. Accordingly, many details of the DME system are omitted and the DME is illustrated and described in functional block diagram and only to the extent necessary for the exposition of the present invention. Reference is made to an article by Burgmann, in the proceedings of the Institute of Electrical Engineering, vol. 96, Part III, No. 43, pps. 395 to 402, for a detailed exposition of a preferred DME equipment employed in the system of this invention.

The DME transmitter 13 transmits pulses at a carrier frequency F1, the pulses having time positions corresponding with the bearing of each transmitting aircraft. The pulse repetition rate for each craft, accordingly, is thirty cycles per second, one pulse being produced for each period of the output of the thirty cycle filter 4. Output pulses from the DME transmitter 13 are received at a ground beacon station 14 which may be adjacent to the ODR transmitter 1, if desired, and which transponds pulses received from the DME transmitter 13 on a new frequency F2. The pulses of frequency F2 transponded by the DME transponder 14 are received aboard each of the aircraft utilizing the system by means of its DME receiver 15. Each DME receiver 15 includes, or has associated therewith, a phantastron type automatic search and track unit, 16, the details of construction and operation of which are disclosed in the article by Burgmann, above referred to, but which is briefly described at this point, for the convenience of the reader. The phantastron 16 is started by a pulse from the multi-vibrator 12, associated with DME transmitter 13, at the time of transmission, or with a fixed delay. It produces a square waveform, the trailing edge of which is kept in co-incidence with the received beacon signal by tracking circuits which control the phantastron plate voltage. The plate voltage is then used as a measure of the distance to the beacon, being measured by meter 17.

The trailing edge of the phantastron pulse is selected by a suitably poled differentiating circuit 18 and employed to trigger a pulse transmitter 19, operating at frequency F3, which may be different from both F1 and F2, to avoid confusion.

To summarize the operation thus far, in response to a transmission on frequency F1 from DME transmitter 13 aboard a given local aircraft, and after a time corresponding with the range of that local aircraft from the DME transponder 14, retransmission of a pulse takes place from that local aircraft, on frequency F3.

While all aircraft utilizing the system receive pulses at frequency F2, which have been transponded from beacon 14 in response to a transmission from the DME transmitter 13 aboard one given local craft, only that local craft now effects a further transmission on a frequency F3. Transmissions from pulse transmitter 19 at frequency F3 are transponded by a pulse transponder 20 adjacent the DME transponder 14, being retransmitted from the latter on frequency F4. Each of the aircraft of the system is provided with a pulse receiver 21 for receiving pulses at frequency F4, receivers 21 being ungated, and the output of the receivers 21 being applied in intensifying relation to the intensifier grid 9 of the cathode ray tube indicator 8.

Since in the present system transmission times of pulses may be measured in microseconds, whereas time positions of pulses for the representation of azimuth or bearing occurs within a fundamental period of one-thirtieth of a second, transmission times are completely negligible as effecting measurements of azimuth or bearing. It will be evident, then, that aboard each of the aircraft of the system, and in response to the reception of pulses from the pulse transponder 20, at frequency F4, intensification of the trace provided by the cathode ray tube 8 will take place at angular positions corresponding with bearings of various craft utilizing the system, and that intensification of the beam of the tube 8 takes place, at each craft, regardless of the point of origin of the pulses at frequency F1, which initiated the cycle of operation within the system, since ultimately all intensifications take place in response to pulses received by the pulse receivers 21, and the latter are always open.

The pulses received by DME receiver 15, at each aircraft, and on frequency F2, are employed to initiate a radial sawtooth sweep at the indicator 8 on that aircraft, by amplifying the short pulse in amplifier 22, and employing the amplified pulse to synchronize a sawtooth generator 23, the latter having its output connected to radial deflection electrode 10 in cathode ray tube indicator 8. Sweep time is selected to be sufficiently short to measure transmission times of pulses, from aircraft utilizing the system, to transponders 14 and 20, and back to the craft.

Describing now the operation of the present system, and assuming the presence of only two aircraft, each at a different bearing and range, for the sake of simplicity of exposition, it will be realized that aboard each of the two aircraft, which may be identified by the symbols X and Y, is present a cathode ray oscilloscope 8 having an electron beam which is rotating in exact synchronism and identical phase aboard the two aircraft, since the circular deflection voltages for the beams are derived from omnidirectional signal of identical phase for all directions, transmitted from the ODR transmitter 1, and received and detected in ODR receiver 2 aboard each of the aircraft. The aircraft X and Y, which we have assumed to be at different bearings, transmit pulses at frequency F1, the pulses from each of the craft having a different time position corresponding with the bearing of the craft.

Turning to Figure 2 of the drawings, let us assume that initial transmission from aircraft X takes place at a time A on the timing diagram, corresponding with a bearing which we may arbitrarily assume to be due north. The pulse arrives at the transponder 14, is transponded at a frequency F2, and is thereafter received aboard both the aircraft X and the aircraft Y. Reception aboard the aircraft X takes place at a time corresponding with the range of the aircraft X from the transponder 14 and the received pulse serves to control range tracking and indication at aircraft X, and also to generate a timing pulse for transmission from pulse transmitter 19, on frequency F3. Simultaneously with the latter transmission is initiated generation of a sawtooth wave by the sawtooth generator 23 aboard the aircraft X. This time is B. Assuming that the bearing of the aircraft is due north, the voltages on the plate 7, at this time, will be such as to deflect the beam of the cathode ray tube vertically upwards (see Figure 3).

The pulse provided by the transmitter 19 on frequency F3 is transponded by the pulse transponder 20 at frequency F4, being received aboard the aircraft X by the pulse receiver 21 at a time E, intensifying the beam of the cathode ray tube indicator 8 at time E and consequently providing an indication of its own range in terms of radial distance of an intensified spot on the face of the indicator and an indication of its own bearing in terms of the angular position of the spot about the face of the indicator. The time interval BE represents, then, distance from aircraft X to transponder 20.

So far as concerns the craft Y, voltages applied to the circular trace deflecting electrodes 7 of its cathode ray tube indicator are identical with those aboard the plane X and consequently the deflection of the beam of the tube must take place vertically upwards or in a direction corresponding with north. The plane Y receives at time D, the pulses at frequency F2 provided by the transponder 14 in response to transmission of a pulse at frequency F1 from the aircraft X. The time of reception of the pulse aboard aircraft Y is different from the time of reception of that same pulse aboard aircraft X by reason of the difference in ranges of the aircraft to transponder 14. Reception of the pulse D aboard the aircraft Y results in initiation of a fast radial sweep of the beam of the cathode ray tube 8 aboard the craft Y in a direction corresponding with north, i. e., the direction of bearing of the aircraft X. Pulses transponded by the transponder 20 are likewise received aboard the aircraft Y, the time of reception aboard the craft Y being different than in the case of the craft X by reason of its difference in range from transponder 20. Upon reception of each pulse at frequency F4 aboard the aircraft Y, intensification of the electron beam of the cathode ray tube indicator 8 aboard the craft Y takes place, indicating range of the craft X, the time position of the intensifying pulse aboard the craft Y being identified at F in Figure 2.

It will be evident then that the equipment aboard aircraft Y measures a time difference corresponding with the transmission time of successive pulses of radiant energy from the transponders 14 and 20 to the aircraft X. In the case of aircraft X, as well as in the case of the aircraft Y, the time measured corresponds with the difference in time of reception of transponded pulses from the transponders 14 and 20, respectively, which, aboard the craft Y, is independent of the distance of the craft Y from the transponders 14 and 20. That this is so can be demonstrated mathematically in a very simple manner as follows:

Let $t$ = microseconds per unit of range,

Let $t_0$ equal the time of initiation of a pulse at frequency $f_1$ from craft X, Let $m$ equal the range of the craft X, and Let $n$ equal the range of the craft Y from the transponders 14 and 24.

(1) $t_0 + mt$ = transpond time of transponder 14.
(2) $t_0 + 2mt$ = reception time of pulse from transponder 14 at plane X.
(3) $t_0 + 2mt$ = time of initiation of fast sweep at plate X.
(4) $t_0 + mt + nt$ = reception time at plane Y of signal from transponder 14.
(5) $t_0 + mt + nt$ = time of initiation of fast sweep at plane Y.
(6) $t_0 + 2mt$ = transmission time of transmitter 23 on plane X.
(7) $t_0 + 3mt$ = transpond time at transponder 24.
(8) $t_0 + 4mt$ = reception time at plate 8 of pulse transponded from transponder 24.
(9) $t_0 + 3mt + nt$ = reception time at plane Y of pulse transponded from transponder 24.
(10) $t_0 + 4mt$ = intensification time at plane X.
(11) $t_0 + 3mt + nt$ = reception time at plane Y.

Measured time at craft $X = (10) - (3) = 2mt$.
Measured time at craft $Y = (11) - (5) = 2mt$.

Various modifications of the system as disclosed may be resorted to. For example, the circular trace of cathode ray tube 8 may be controlled from 30 cycle per second filter 4, providing an indication of the bearing of the local craft at a fixed position, regardless of its actual bearing from ODR transmitter 1. Further, the bearing responsive trace produced on cathode ray tube indicator 8 may be made linear instead of circular, if desired, by connecting one set of deflection plates to the output of filter 4 or filter 5, and by applying the output of sawtooth generator 23 to the plates perpendicular to the first.

While I have disclosed a system for measuring ranges of remote objects from a predetermined geographic location, wherein pulses are transmitted from a craft on one frequency, transponded on another frequency, from the geographic location to the craft, and wherein reception at the craft of the transponded pulse gives rise to a further pulse at the craft on a third frequency which is again transponded from the location on still a fourth frequency. The time elapse between transponded pulses may be measured anywhere and provides a measure of range of the transmitting craft.

While I have utilized four frequencies, in the above described system, this is by no means essential, and arises from the desirability of enabling distinction between a first and a second transponded pulse. I realize that such distinction may be effected in terms of any characteristic of the transponded pulses, other than frequency, such as, for example pulse length. I have referred to the desirability of distinguishing between first and second pulses; such distinction is not essential in terms of difference of character of pulses, for example in terms of difference of pulse length or frequency, since distinction between pulses is inherently present in that one occurs before another, i. e. in terms of pulse time position. Accordingly, the present invention may be practiced utilizing only two frequencies, one for transmission from aircraft, and another for transponding, without any other distinction between pulses than their order of occurrence, and the time elapse of successive pulse pairs, originating either at the transponders or at the aircraft may be measured, as a measure of range between a transmitting aircraft and a transponder, at remote locations.

Still further modifications and re-arrangements of the present invention will suggest themselves to those skilled in the pertinent art, and may be resorted to without departing from the true scope of the invention as defined in the appended claims.

What I claim and desire to secure by Letters Patent of the United States is:

1. In combination, a plurality of craft, means aboard one of said craft for transmitting a pulse, means for repeating said pulse from a fixed geographic location, means responsive to reception aboard said one of said craft of said repeated pulse for transmitting a further pulse, means at said location for repeating said further pulse, means aboard another of said craft for measuring short time intervals comprising a timing initiator and a timing terminator, means responsive to arrival at said another of said craft of said first repeated pulse for actuating said timing initiator and means responsive to arrival at said another of said craft of said further repeated pulse for actuating said timing terminator.

2. In combination aboard a plurality of craft, a cathode ray tube indicator aboard each craft having a cathode ray beam and means for deflecting said beam in each of two coordinate directions, means for effecting commonly synchronized periodic movement of each of said beams aboard said plurality of craft in one of said coordinate directions, means for effecting first transmissions from each of said craft at times representative of bearing of each craft from a predetermined location, said times being determined by reference to said periodic movement of said beams, means responsive to said first transmission from each craft for effecting further transmission from that craft, and means responsive to the successive transmissions from each of said craft for effecting timed deflections of the beam aboard all of said craft in another of said coordinate directions and to an extent corresponding with the range of said each of said craft.

References Cited in the file of this patent

UNITED STATES PATENTS

| | | |
|---|---|---|
| 2,513,282 | Busignies | July 4, 1950 |
| 2,632,158 | Wallace | Mar. 17, 1953 |